(12) United States Patent
Schaffer et al.

(10) Patent No.: US 11,873,400 B2
(45) Date of Patent: Jan. 16, 2024

(54) SHELF STABLE AQUEOUS DISPERSIONS SUITABLE FOR USE IN FOOD CONTACT APPLICATIONS

(71) Applicants: Dow Global Technologies LLC, Midland, MI (US); Rohm and Haas Company, Collegeville, PA (US)

(72) Inventors: Nicholas B. Schaffer, Midland, MI (US); Kevin J. Bouck, Broomfield, CO (US); Sarah E. Decato, Wilmington, DE (US); Shrikant Dhodapkar, Lake Jackson, TX (US); Intan M. Hamdan, Pearland, TX (US); Remi A. Trottier, Angleton, TX (US); Richard A. Lundgard, Midland, MI (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 469 days.

(21) Appl. No.: 17/256,991

(22) PCT Filed: Jun. 25, 2019

(86) PCT No.: PCT/US2019/038989
§ 371 (c)(1),
(2) Date: Dec. 29, 2020

(87) PCT Pub. No.: WO2020/005942
PCT Pub. Date: Jan. 2, 2020

(65) Prior Publication Data
US 2021/0155798 A1    May 27, 2021

Related U.S. Application Data

(60) Provisional application No. 62/692,353, filed on Jun. 29, 2018.

(51) Int. Cl.
| | | |
|---|---|---|
| C08L 71/02 | (2006.01) |
| C09D 7/45 | (2018.01) |
| C09D 5/02 | (2006.01) |
| C09D 183/04 | (2006.01) |
| C08L 83/04 | (2006.01) |

(52) U.S. Cl.
CPC .............. *C08L 71/02* (2013.01); *C08L 83/04* (2013.01); *C09D 5/027* (2013.01); *C09D 7/45* (2018.01); *C09D 183/04* (2013.01)

(58) Field of Classification Search
CPC ... C08K 5/098; C08J 2323/08; C08J 2323/14; C08J 2483/04; C08L 71/02
See application file for complete search history.

(56) References Cited

U.S. PATENT DOCUMENTS

| | | |
|---|---|---|
| 2009/0226623 A1 | 9/2009 | Liu |
| 2017/0107378 A1 | 4/2017 | Hentze et al. |

FOREIGN PATENT DOCUMENTS

| | | |
|---|---|---|
| CN | 102094356 A | 6/2011 |
| JP | S5951236 A | 3/1984 |
| JP | S59219400 A | 12/1984 |
| WO | 2018145069 A1 | 8/2018 |

OTHER PUBLICATIONS

PCT/US2019/038989, International Preliminary Report on Patentability dated Dec. 29, 2020.
PCT/US2019/038989, International Search Report and Written Opinion dated Oct. 23, 2019.

*Primary Examiner* — Alexandre F Ferre

(57) ABSTRACT

A composition comprising the following components: A) a metal stearate; B) a secondary alcohol ethoxylate of the formula $C_{12-14}H_{25-29}O[CH_2CH_2O]_xH$, wherein x=7; C) a secondary alcohol ethoxylate of the formula $C_{12-14}H_{25-29}O[CH_2CH_2O]_xH$, C wherein x=20; D) octanoic acid; E) sodium lauryl sulfate; F) a polydimethylsiloxane (PDMS); and G) water.

15 Claims, No Drawings

SHELF STABLE AQUEOUS DISPERSIONS SUITABLE FOR USE IN FOOD CONTACT APPLICATIONS

BACKGROUND

There is a need for improved shelf stable aqueous dispersions, suitable for use as an additive on polymeric materials used in food contact applications. Dispersions are described in the following references: JP59051236A (Abstract), JP59219400A (Abstract), CN102094356A (Abstract). However, such dispersion have long term stability issues and/or are not suitable for food contact applications. Thus, as discussed, there is a need for improved shelf dispersions for use as an additive on polymeric materials used in food contact applications. This need has been met by the following invention.

SUMMARY OF THE INVENTION

A composition comprising the following components:
A) a metal stearate comprising;
B) a secondary alcohol ethoxylate as shown below,

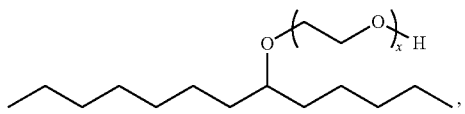

wherein x=7;
C) a secondary alcohol ethoxylate as shown below,

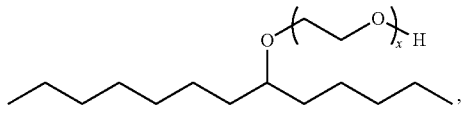

wherein x=20;
D) octanoic acid;
E) sodium lauryl sulfate;
F) a polydimethylsiloxane (PDMS); and
G) water.

DETAILED DESCRIPTION

A shelf stable (≥6 months at room temperature, ≥4 weeks at 40° C.) aqueous metal stearate dispersions have been discovered, which are suitable for use as an additive on polymeric materials used in food contact applications. The improved shelf stability allows the dispersions to be shipped and stored prior to use. The dispersions contain components that are food contact approved in the United States and in the European Union.

As discussed above, a composition is provided, comprising the following components:
A) a metal stearate comprising;
B) a secondary alcohol ethoxylate as shown below,

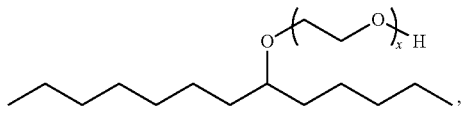

wherein x=7;
C) a secondary alcohol ethoxylate as shown below,

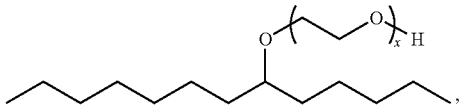

wherein x=20;
D) octanoic acid;
E) sodium lauryl sulfate;
F) a polydimethylsiloxane (PDMS); and
G) water.

The composition may comprises a combination of two or more embodiments described herein.

Each component of the composition may comprise a combination of two or more embodiments described herein.

In one embodiment, or a combination of embodiments described herein, the metal stearate is selected from calcium stearate, zinc stearate or barium stearate, and further calcium stearate or zinc stearate.

In one embodiment, or a combination of embodiments described herein, the metal stearate is calcium stearate.

In one embodiment, or a combination of embodiments described herein, the metal stearate of claim 1 has a particle size distribution as follows: mean 4.0-10.0 microns, mode 1.0 to 5.0 microns, and D90 10.0 to 20.0 microns These particle size parameters can be measured, for example, using Beckman Coulter laser diffraction instrument, which reports the mean, mode, and D90 values.

In one embodiment, or a combination of embodiments described herein, the amount of component A is from 40 wt % to 60 wt %, or from 40 wt % to 55 wt %, or from 40 wt % to 50 wt %, based on the weight of the composition.

In one embodiment, or a combination of embodiments described herein, the weight ratio of component B to component C is from 0.80 to 1.20, or form 0.85 to 1.15, or from 0.90 to 1.10, or from 0.95 to 1.05.

In one embodiment, or a combination of embodiments described herein, the weight ratio of component D to component E is from 0.80 to 1.20, or form 0.85 to 1.15, or from 0.90 to 1.10, or from 0.95 to 1.05.

In one embodiment, or a combination of embodiments described herein, the weight ratio of component D to component F is from 0.80 to 1.20, or form 0.85 to 1.15, or from 0.90 to 1.10, or from 0.95 to 1.05.

In one embodiment, or a combination of embodiments described herein, the weight ratio of component E to component F is from 0.80 to 1.20, or form 0.85 to 1.15, or from 0.90 to 1.10, or from 0.95 to 1.05.

In one embodiment, or a combination of embodiments described herein, the amount of component B is from 1.0 wt % to 2.0 wt %, or from 1.2 wt % to 1.8 wt %, or from 1.4 wt % to 1.6 wt %, based on the weight of the composition.

In one embodiment, or a combination of embodiments described herein, the amount of component C is from 1.0 wt % to 2.0 wt %, or from 1.2 wt % to 1.8 wt %, or from 1.4 wt % to 1.6 wt %, based on the weight of the composition.

In one embodiment, or a combination of embodiments described herein, the amount of component E is from 0.2 wt % to 0.7 wt %, or from 0.2 wt % to 0.6 wt %, or from 0.2 wt % to 0.5 wt %, based on the weight of the composition.

In one embodiment, or a combination of embodiments described herein, the amount of component D is from 0.2 wt % to 0.7 wt %, or from 0.2 wt % to 0.6 wt %, or from 0.2 wt % to 0.5 wt %, based on the weight of the composition.

In one embodiment, or a combination of embodiments described herein, the PDMS has a viscosity, at 25° C., from 200 to 2000 cSt, or from 250 to 1800 cSt, or from 300 to 1600 cSt, or from 350 to 1200 cSt.

In one embodiment, or a combination of embodiments described herein, the sum amount of components A and G comprise ≥70 wt %, or ≥75 wt %, or ≥80 wt %, or ≥85 wt %, or ≥90 wt %, or ≥95 wt %, or ≥98 wt %, or ≥99 wt % of the total weight of the composition.

In one embodiment, or a combination of embodiments described herein, the sum amount of components A, B, C, D, E, F and G comprise ≥90 wt %, or ≥95 wt %, or ≥98 wt %, or ≥99 wt % of the total weight of the composition.

In one embodiment, or a combination of embodiments described herein, the composition has a pH value from 5.8 to 6.8, or from 6.0 to 6.5, using a silver/silver chloride electrode.

Also is provided is a coated polymer particle, wherein the coating is formed from the composition of any one or more embodiments described herein.

The coated polymer particles may comprise a combination of two or more embodiments described herein.

Also is provided is an article comprising at least one component formed from the coated polymer particles of any one or more embodiments described herein.

An article may comprise a combination of two or more embodiments described herein.

As used herein, a polymer particle is formed from a polymer composition comprising at least one polymer, and optional other additions, such as one or more stabilizers. In one embodiment, the polymer particle is formed from a polymer composition comprising one polymer, and optional other additions, such as one or more stabilizers.

Also provided is a process to form coated polymer particles, said process comprising application the composition of one or more embodiments described herein, to at least a portion (for example, ≥50%) of the total surface of the polymer particles.

In one embodiment, or a combination of embodiments described herein, the polymer particles are formed from a polymer composition comprising an olefin-based polymer.

In one embodiment, or a combination of embodiments described herein, the polymer particles are formed from a polymer composition comprising an ethylene-based polymer.

In one embodiment, or a combination of embodiments described herein, the polymer particles are formed from a polymer composition comprising a propylene-based polymer.

An inventive process may comprise a combination of two or more embodiments described herein.

Also provided are coated polymer particles formed from the process of any one more embodiments described herein.

In one embodiment, or a combination of embodiments described herein, the polymer particles comprise a coating, formed from a composition of one or more embodiments described herein, on at least 50%, or at least 60%, or at least 70%, or at least 80%, or at least 85%, or at least 90%, or at least 95%, of the total surface of the polymer particle. In a further embodiment, the water is removed from the coating.

The total surface area of the polymer particles can be calculated from the average dimensions of the particles (for example, pellets) and the weight of the particles per gram; or by a BET analysis (for example, using a BET instrument available from Micromeritics ASAP 2420). The amount of surface area of the polymer particles that has been coated can be determined by visual inspection, typically with the use of a magnifying glass.

In one embodiment, or a combination of embodiments described herein, the polymer particles are formed from a polymer composition comprising an olefin-based polymer, or an olefin-based interpolymer, or an olefin-based copolymer. In a further embodiment, the olefin-based polymer, interpolymer, or copolymer, comprises ≥90 wt %, or ≥95 wt %, or ≥98 wt % of the polymer composition.

In one embodiment, or a combination of embodiments described herein, the polymer particles are formed from a polymer composition comprising an olefin-based polymer, or an olefin-based interpolymer, or an olefin-based copolymer. In a further embodiment, the olefin-based polymer, interpolymer, or copolymer, comprises ≥90 wt %, or ≥95 wt %, or ≥98 wt % of the polymer particles.

In one embodiment, or a combination of embodiments described herein, the olefin-based polymer is an ethylene-based polymer, or an ethylene-based interpolymer, or an ethylene-based copolymer.

In one embodiment, or a combination of embodiments described herein, the olefin-based polymer is an ethylene/α-olefin interpolymer, and further an ethylene/α-olefin copolymer. In a further embodiment, the α-olefin is selected from the group consisting of propylene, 1-butene, 1-pentene, 1-hexene, 1-heptene, and 1-octene.

In one embodiment, or a combination of embodiments described herein, the olefin-based polymer is an ethylene-based polymer, and the coated particles comprises ≥90 wt %, or ≥95 wt %, or ≥98 wt % of the ethylene-based polymer, based on the weight of the coated particles. In a further embodiment, the ethylene-based polymer is an ethylene/α-olefin interpolymer, and further an ethylene/α-olefin copolymer. In a further embodiment, the α-olefin is selected from the group consisting of propylene, 1-butene, 1-pentene, 1-hexene, 1-heptene, and 1-octene.

In one embodiment, or a combination of embodiments described herein, the olefin-based polymer is a propylene-based polymer, and the coated particles comprises ≥90 wt %, or ≥95 wt %, or ≥98 wt % of the propylene-based polymer, based on the weight of the coated particles. In a further embodiment, the propylene-based polymer is a propylene/α-olefin interpolymer, and further a propylene/α-olefin copolymer. In a further embodiment, the α-olefin is selected from the group consisting of 1-butene, 1-pentene, 1-hexene, 1-heptene, and 1-octene. In another embodiment, the propylene-based polymer is a propylene/ethylene interpolymer, and further a propylene/ethylene copolymer.

In one embodiment, or a combination of embodiments described herein, the polymer particles are formed from a polymer composition comprising an olefin-based polymer and at least one other thermoplastic polymer. In a further embodiment, the at least one other thermoplastic polymer is selected from the group consisting of polystyrene homopolymer, polyethylene homopolymer and polypropylene homopolymer.

In one embodiment, or a combination of embodiments described herein, the coated particles comprises from 0.02 to 3.00 weight percent, or from 0.04 to 2.50 weight percent, or from 0.06 to 2.00 weight percent, or from 0.08 to 1.50 weight percent of the coating, formed from a composition, as described herein, based on the dry weight (water removed) of the coated polymer particles.

In one embodiment, or a combination of embodiments described herein, the coated particles comprises from 0.10 to 3.00 weight percent, or from 0.20 to 2.50 weight percent, or from 0.30 to 2.00 weight percent, or from 0.30 to 1.50 weight percent, or from 0.40 to 1.50 weight percent of a coating, formed from a composition, as described herein, based on the dry weight (water removed) of the coated polymer particles.

The invention also provides a process to form coated polymer particles, said process comprises contacting polymer particles with a composition of one or more embodiments, as described herein.

The drying of the wet-coated polymer particles refers to removing the aqueous medium from the surface of the particles, to form dry coated particles. The drying step can be monitored by taking a sample of coated particles, for example, coated pellets, and analyzing for moisture on the surface of the pellets using Computrac Vapor Pro XL Analyzer (Arizona Instruments). The particles are heated at 200° C. for 10 minutes, and the presence of water is detected.

Polymer Particles

The term "polymer particles," is in reference to the particles that are coated with a composition, as described herein, and typically refers to polymer pellets, but may also refer to polymer beads, flakes, or powders. Typical polymer particles are generally substantially platelet, spherical, cylindrical, or rod shape. While the cross-sectional area may vary, depending upon the polymer, preferably, the cross-sectional area of a polymer particle is from $3 \times 10^{-3}$ square inch ($1.93 \times 10^{-2}$ square centimeters) to 0.2 square inch (1.29 square centimeters); that is from 1/16 inch (0.15875 cm) to 1/2 inch (1.27 cm) in diameter, if the cross-section is, for example, circular. In one embodiment, the particles have a cross-sectional area from 0.01 square inch ($6.45 \times 10^{-2}$ square centimeters) to 0.05 square inch (0.322 square centimeters); that is from 0.125 inch (0.3175 cm) to 0.375 inch (0.9525 cm) in diameter, if, for example, the cross-section is circular. In one embodiment, are particles are from 0.25 cm to 0.40 cm in diameter.

The polymer particles are in the form of particulate solids, ranging in size from powders to pellets. Pellets are particulate solids, and are generally, but not exclusively, formed through extrusion and pelletization processes, with a typical average particle size (average of the longest dimension) ≥2 mm, typically from 2 mm to 10 mm, further from 2 mm to 6 mm, and further from 2 mm to 4 mm. Micropellets typically have an average particle size less than that of a standard pellet, yet greater than those average particle sizes produced from general commercial die capabilities. The average particle size of micropellets typically range from 200 microns to 2 mm. The micropellets generally exhibit a semi-spheroidal shape.

The polymer particles may be formed from polymer compositions containing any polymer; for example, an olefin-based polymer. Exemplary olefin-based polymers include, but are not limited to, homopolymers of ethylene, and interpolymer or copolymers of ethylene and at least one ethylenically unsaturated monomer, selected from the group consisting of $C_3$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids.

Exemplary olefin-based polymers further include, but are not limited to, homopolymers of propylene, and interpolymers or copolymers of propylene and at least one ethylenically unsaturated monomer, selected from the group consisting of $C_2$ and $C_4$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids.

In one embodiment, or a combination of embodiments described herein, the polymer particles are formed from a polymer composition comprising an olefin-based polymer, further an olefin-based interpolymer, further an olefin-based copolymer.

In one embodiment, or a combination of embodiments described herein, the olefin-based polymer has a density from 0.854 to 0.945, or from 0.860 to 0.940 g/cc, or from 0.865 to 0.930 g/cc, or from 0.870 to 0.920 g/cc (1 cc=1 cm$^3$). In a further embodiment, the olefin-based polymer is an ethylene-based polymer, and further an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene. In another embodiment, the olefin-based polymer is a propylene-based polymer, and further a propylene-based interpolymer. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, or a combination of embodiments described herein, the olefin-based polymer has a crystallinity of ≤50 percent, or ≤45 percent, or ≤40 percent, or from 1.0 to 35 percent, or from 2.0 to 30 percent, or from 5.0 to 20 percent. In a further embodiment, the olefin-based polymer is an ethylene-based polymer, and further an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene. In another embodiment, the olefin-based polymer is a propylene-based polymer, and further a propylene-based interpolymer. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, or a combination of embodiments described herein, the olefin-based polymer has a melting point of ≤110° C., or from 25 to 100° C., or from 30 to 95° C., or from 40 to 90° C. In a further embodiment, the olefin-based polymer is an ethylene-based polymer, and further an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene. In another embodiment, the olefin-based polymer is a propylene-based polymer, and further a propylene-based interpolymer. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, or a combination of embodiments described herein, the olefin-based polymer has a weight average molecular weight (Mw) ≥20,000 g/mole, or from 20,000 to 1,000,000 g/mole, or from 50,000 to 500,000 g/mole, or from 80,000 to 300,000 g/mole. In a further embodiment, the olefin-based polymer is an ethylene-based polymer, and further an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene. In another embodiment, the olefin-based polymer is a propylene-based polymer, and further a propylene-based interpolymer. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, or a combination of embodiments described herein, the olefin-based polymer has a number average molecular weight (Mn) ≥10,000 g/mole, or from 10,000 to 200,000 g/mole, or from 15,000 to 100,000 g/mole, or from 20,000 to 60,000 g/mole. In a further embodiment, the olefin-based polymer is an ethylene-based polymer, and further an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene. In another embodiment, the olefin-based polymer is a propylene-based polymer, and further a propylene-based interpolymer. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, or a combination of embodiments described herein, the olefin-based polymer is selected from homogeneous polymers described in U.S. Pat. No. 3,645,992, issued to Elston; high density polyethylene (HDPE), as described in U.S. Pat. No. 4,076,698, issued to Anderson; heterogeneously branched linear low density polyethylene (LLDPE); heterogeneously branched ultra-low linear density polyethylene (ULDPE); homogeneously branched, linear ethylene/alpha-olefin copolymers; homogeneously branched, substantially linear ethylene/alpha-olefin polymers, which can be prepared, for example, by a process disclosed in U.S. Pat. Nos. 5,272,236 and 5,278,272, the disclosures of which are incorporated herein by reference; and high pressure, free radical polymerized ethylene polymers and copolymers, such as low density polyethylene (LDPE).

In one embodiment, or a combination of embodiments described herein, the olefin-based polymer is an olefin block copolymers, for example, an ethylene multi-block copolymer, such as, for example, those described in the International Publication No. WO2005/090427 and U.S. Patent Publication No. 2006/0199930.

In one embodiment, or a combination of embodiments described herein, the olefin-based polymer is a low density polyethylene (LDPE). In a further embodiment, the LDPE has a density from 0.910 to 0.925 g/cc, and a melt index (I2, 190° C. with 2.16 kg weight) from 0.1 to 100 g/10 min.

In one embodiment, or a combination of embodiments described herein, the olefin-based polymer is an ethylene vinyl acetate (EVA). In another embodiments, the olefin-based polymer is an ethylene-methyl acrylate (EMA). In one embodiment, or a combination of embodiments described herein, the olefin-base polymer is an ethylene-acrylic acid (EAA) copolymer, or an ethylene-methacrylic acid copolymer.

In one embodiment, or a combination of embodiments described herein, the polymer particles are formed from a polymer composition comprising at least two olefin-based polymers, which differ in one or more of the following properties: density, Mn, Mw, MWD, comonomer type and/or comonomer content.

In one embodiment, or a combination of embodiments described herein, the polymer composition comprises one or more additives. Additives include, but are not limited to, antioxidants, ultraviolet absorbers, antistatic agents, colorants (e.g., titanium dioxide, carbon black and pigments), viscosity modifiers, anti-block agents, release agents, coefficient of friction (COF) modifiers, thermal stabilizers, odor modifiers/absorbents, and any combination thereof.

The polymer particles may comprise a combination of two or more embodiments described herein. A polymer composition may comprise a combination of two or more embodiments as described herein.

An olefin-based polymer may comprise a combination of two or more embodiments described herein. An olefin-based interpolymer may comprise a combination of two or more embodiments as described herein. An olefin-based copolymer may comprise a combination of two or more embodiments as described herein.

In one embodiment, or a combination of embodiments described herein, the polymer particles are formed from a polymer composition comprising an ethylene-based polymer, and further an ethylene-based interpolymer. Suitable ethylene-based interpolymers, include, but are not limited to, ethylene/alpha-olefin interpolymers or copolymers, for example, ethylene/$C_3$-$C_8$ alpha-olefin interpolymers or copolymers.

In one embodiment, or a combination of embodiments described herein, the polymer particles are formed from a polymer composition comprising an ethylene-based polymer, and further an ethylene/α-olefin/diene terpolymers, for example ethylene/propylene/diene terpolymers.

In one embodiment, or a combination of embodiments described herein, the polymer particles are formed from a polymer composition comprising a polymer is selected the group consisting of ethylene-based polymers, and propylene-based polymer.

In one embodiment, or a combination of embodiments described herein, the polymer particles are formed from a polymer composition comprising an ethylene-based polymer, further an ethylene-based interpolymer, and further an ethylene-based copolymer. In one embodiment, or a combination of embodiments described herein, the ethylene-based interpolymer is an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, or a combination of embodiments described herein, the ethylene-based polymer, and further the ethylene-based interpolymer, has a density from 0.850 to 0.920 g/cc, or from 0.852 to 0.910 g/cc, or from 0.854 to 0.900 g/cc, or from 0.856 to 0.890 g/cc, or from 0.858 to 0.880 g/cc (1 cc=1 cm$^3$). In a further embodiment, the ethylene-based interpolymer is an ethylene/α-olefin interpolymer, and or an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, or a combination of embodiments described herein, the ethylene-based polymer, and further the ethylene-based interpolymer, has a density from 0.860 to 0.920 g/cc, or from 0.865 to 0.910 g/cc, or from 0.870 to 0.900 g/cc (1 cc=1 cm$^3$). In a further embodiment, the ethylene-based interpolymer is an ethylene/α-olefin interpolymer, and or an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, or a combination of embodiments described herein, the ethylene-based polymer, and further the ethylene-based interpolymer, has a melt index (I2, 190° C. and 2.16 kg) from 0.1 to 50 g/10 min, or from 0.5 to 40 g/10 min, or from 0.8 to 30 g/10 min. In a further embodiment, the ethylene-based interpolymer is an ethylene/α-olefin interpolymer, and or an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, or a combination of embodiments described herein, the ethylene-based polymer, and further the ethylene-based interpolymer, has a melt index (I2, 190° C. and 2.16 kg) from 0.1 to 10 g/10 min, or from 0.5 to 8.0 g/10 min, or from 0.8 to 6.0 g/10 min. In a further embodiment, the ethylene-based interpolymer is an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, or a combination of embodiments described herein, the ethylene-based polymer, and further the ethylene-based interpolymer, has a melt index (I2, 190° C. and 2.16 kg) from 0.1 to 5.0 g/10 min, or from 0.2 to 4.5 g/10 min, or from 0.3 to 4.0 g/10 min, or from 0.4 to 3.5 g/10 min, or from 0.5 to 3.0 g/10 min, or from 0.6 to 2.5 g/10 min, or from 0.6 to 2.0 g/10 min. In a further embodiment, the ethylene-based interpolymer is an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, or a combination of embodiments described herein, the ethylene-based polymer, and further the ethylene-based interpolymer, has a molecular weight distribution (MWD), from 1.7 to 3.5, or from 1.8 to 3.0, or from 1.8 to 2.8, or from 1.8 to 2.5. In a further embodiment, the ethylene-based interpolymer is an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

Examples of ethylene-based polymers include low density polyethylene (LDPE), high density polyethylene (HDPE), heterogeneously branched linear polymers (include Ziegler-Natta polymerized polymers, such as LLDPE, and include products such as DOWLEX™ Linear Low Density Polyethylene (LLDPE) available from The Dow Chemical Company), homogeneously branched substantially linear polymer (such as AFFINITY™ Polyolefin Plastomers and ENGAGE™ Polyolefin Elastomers, both available from The Dow Chemical Company) homogeneously branched linear polymers (such as EXACT™ Polymers available from ExxonMobil), olefin multiblock copolymers (such as INFUSE™ Olefin Block Copolymers available from The Dow Chemical Company), and olefin block composites (such as INTUNE™ available from the Dow Chemical Company). Other examples of ethylene-based polymers include ethylene-based copolymers formed from high pressure, free-radical polymerizations. Examples polymers include SURLYN™, BYNEL™, ELVAX™, NUCREL™ (DuPont) and DUTRAL™ (Versalis).

An ethylene-based polymer may comprise a combination of two or more embodiments described herein. An ethylene-based interpolymer may comprise a combination of two or more embodiments described herein. An ethylene-based copolymer may comprise a combination of two or more embodiments described herein.

In one embodiment, or a combination of embodiments described herein, the polymer particles are formed from a polymer composition comprising an ethylene/alpha-olefin/diene interpolymer, and further an ethylene/alpha-olefin/diene terpolymer, and further EPDM. In a further embodiment, the diene is ENB.

In one embodiment, or a combination of embodiments describe herein, the ethylene/alpha-olefin/diene interpolymer has a density from 0.850 to 0.940 g/cc, or from 0.855 to 0.935 g/cc, or from 0.860 to 0.930 g/cc, or from 0.865 to 0.925 g/cc (1 cc=1 cm$^3$). In a further embodiment, the interpolymer is an ethylene/alpha-olefin/diene terpolymer, and further an EPDM. In a further embodiment, the diene is ENB.

In one embodiment, or a combination of embodiments describe herein, the ethylene/alpha-olefin/diene interpolymer has a density from 0.850 to 0.890 g/cc, or from 0.855 to 0.885 g/cc, or from 0.860 to 0.880 g/cc (1 cc=1 cm$^3$). In a further embodiment, the interpolymer is an ethylene/alpha-olefin/diene terpolymer, and further an EPDM. In a further embodiment, the diene is ENB.

In one embodiment, or a combination of embodiments describe herein, the ethylene/alpha-olefin/diene interpolymer has a density from 0.850 to 0.880 g/cc, or from 0.855 to 0.875 g/cc, or from 0.858 to 0.870 g/cc. In a further embodiment, the interpolymer is an ethylene/alpha-olefin/diene terpolymer, and further an EPDM. In a further embodiment, the diene is ENB.

In one embodiment, or a combination of embodiments describe herein, the ethylene/alpha-olefin/diene interpolymer has a Mooney Viscosity (ML 1+4, 125° C.) from 10 to 100, or from 20 to 80, or from 30 to 60. In a further embodiment, the interpolymer is an ethylene/alpha-olefin/diene terpolymer, and further an EPDM. In a further embodiment, the diene is ENB.

In one embodiment, or a combination of embodiments describe herein, the ethylene/alpha-olefin/diene interpolymer has a melt index (I2, 190° C. and 2.16 kg) from 0.1 to 100 g/10 min, or from 0.5 to 50 g/10 min, or from 1.0 to 20 g/10 min. In a further embodiment, the interpolymer is an ethylene/alpha-olefin/diene terpolymer, and further an EPDM. In a further embodiment, the diene is ENB.

In one embodiment, or a combination of embodiments describe herein, the ethylene/alpha-olefin/diene interpolymer comprises from 50 wt % to 65 wt %, or from 52 wt % to 62 wt %, of from 54 wt % 60 wt % of C2 (ASTM D3900), based on the weight of the interpolymer. In a further embodiment, the interpolymer is an ethylene/alpha-olefin/diene terpolymer, and further an EPDM. In a further embodiment, the diene is ENB.

In one embodiment, or a combination of embodiments describe herein, the ethylene/alpha-olefin/diene interpolymer has a percent crystallinity ≤50%, or ≤40%, or ≤30%, or ≤20%, or ≤10%, or ≤5.0%, and ≥0.5%, or ≥1.0%, or ≥2.0%. In a further embodiment, the interpolymer is an ethylene/alpha-olefin/diene terpolymer, and further an EPDM. In a further embodiment, the diene is ENB.

In one embodiment, or a combination of embodiments describe herein, the ethylene/alpha-olefin/diene interpolymer has a percent crystallinity ≤10%, or ≤9.0%, or ≤8.0%, or ≤7.0%, or ≤6.0%, or ≤5.0%. In a further embodiment, the interpolymer is an ethylene/alpha-olefin/diene terpolymer, and further an EPDM. In a further embodiment, the diene is ENB.

In one embodiment, or a combination of embodiments describe herein, the ethylene/alpha-olefin/diene interpolymer has a molecular weight distribution (MWD) from 2.0 to 5.0, or from 2.0 to 4.5, or from 2.0 to 4.0, or from 2.0 to 4.5, or from 2.0 to 3.5, or from 2.0 to 3.0. In a further embodiment, the interpolymer is an ethylene/alpha-olefin/diene terpolymer, and further an EPDM. In a further embodiment, the diene is ENB.

In one embodiment, or a combination of embodiments describe herein, the polymer composition comprises ≥95 wt %, or ≥98 wt %, ≥ or 99 wt % of the ethylene/alpha-olefin/diene interpolymer, based on the weight of the polymer composition. In a further embodiment, the interpolymer is an ethylene/alpha-olefin/diene terpolymer, and further an EPDM. In a further embodiment, the diene is ENB.

Examples of ethylene/alpha-olefin/diene interpolymer include NORDEL™ EPDM (The Dow Chemical Company) and KELTAM™ EPDM (Laxness).

An ethylene/alpha-olefin/diene interpolymer may comprise a combination of two or more embodiments described herein. An ethylene/alpha-olefin/diene terpolymer may comprise a combination of two or more embodiments described herein. An EPDM may comprise a combination of two or more embodiments described herein.

In one embodiment, or a combination of embodiments described herein, the polymer particles are formed from a polymer composition comprising a propylene-based polymer, further a propylene-based interpolymer, and further a propylene-based copolymer.

In one embodiment, or a combination of embodiments described herein, the propylene-based polymer, and further the propylene-based interpolymer, has a melt flow rate (MFR, 230° C. with 2.16 kg weight) from 0.1 to 50 g/10 min, or from 0.5 to 40 g/10 min, or from 1.0 to 30 g/10 min. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, or a combination of embodiments described herein, the propylene-based polymer, and further the propylene-based interpolymer, has a melt flow rate (MFR, 230° C. with 2.16 kg weight) from 0.1 to 10 g/10 min, or from 0.5 to 8.0 g/10 min, or from 1.0 to 6.0 g/10 min. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, or a combination of embodiments described herein, the propylene-based polymer, and further the propylene-based interpolymer, has a density from 0.860 to 0.920 g/cc, or from 0.865 to 0.910 g/cc, or from 0.870 to 0.900 g/cc (1 cc=1 cm³). In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, or a combination of embodiments described herein, the propylene-based polymer, and further the propylene-based interpolymer, has a molecular weight distribution (MWD) of 3.5 or less; or 3.0 or less; or from 1.8 to 3.5, or from 1.8 to 3.0. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

Examples of such propylene/alpha-olefin interpolymers and copolymers, and propylene/ethylene interpolymers or copolymers are described in U.S. Pat. Nos. 6,960,635 and 6,525,157, incorporated herein by reference. Suitable copolymers are commercially available from The Dow Chemical Company, under the tradename VERSIFY™, or from ExxonMobil Chemical Company, under the tradename VISTAMAXX™.

A propylene-based polymer may comprise a combination of two or more embodiments as described herein. A propylene-based interpolymer may comprise a combination of two or more embodiments as described herein. A propylene-based copolymer may comprise a combination of two or more embodiments as described herein.

Compositions

The composition, as described herein, is typically employed in an effective amount. Effective amounts often vary, depending upon the polymer and the end-use application. Typically, an effective amount of composition is that amount which decreases the unconfined yield strength of the polymer particles, comprising a coated formed from the composition, by at least about 20 percent, preferably by at least about 30 percent, as compared to the unconfined yield strength of the polymer particles, similar in all respects, except the particles do not comprises a coating formed from the composition. In many instances, the unconfined yield strength may be decreased by over 50 percent, or over 100 percent, or over 200 percent, or even 500 percent or more.

Generally, the maximum effective amount of composition (dispersion) is the greatest amount of the composition, at which the physical properties of the polymer are not adversely affected, in the desired end-use application of the polymer particles. In one embodiment, the amount of the composition is ≤5.0 weight percent, or ≤4.0 weight percent, or ≤3.0 weight percent, based on the total dry weight (no water) of the coated polymers. In one embodiment, the amount of the composition is ≥0.25 weight percent, or ≥0.30 weight percent, or ≥0.35 weight percent, or ≥0.40 weight percent, or ≥0.45 weight percent, based on the total dry weight of coated particles.

PDMS

The type of PDMS, and its effective amount, will vary, depending upon the composition and polymer particles. The preferred PDMS are those, in which the viscosity is not so high, such that the binder is difficult to apply. Generally, oils with a viscosity in the range from 50 to 60,000 centistokes, or from 100 to 10,000 centistokes, at 25° C., are useful.

In one embodiment, the PDMS has the structural formula —Si($R^1R^1$)—O— wherein the $R^1$ groups are $C_1$-$C_{18}$ hydrocarbyl groups. Particularly preferable hydrocarbyl groups include aliphatic groups. A particularly preferable group for $R^1$ is a methyl group. These materials are commercial available from Dow Corning. The PDMS may be employed in purified form, in solutions, emulsions or in mixtures.

Processes for Forming Coated Polymer Particles

In one embodiment, the process of forming coated polymer particles comprises contacting the polymer particles with the composition of one or more embodiments described herein. The composition should be contacted with the polymer particles, under conditions such that the polymer particles can be sufficiently physically coated with the composition.

In one embodiment, such contacting is conducted by a first liquid feeding of part, or all, of the composition onto the polymer particles, or immersing the polymer particles in part, or all, of the composition. The means of contacting and distributing may vary, so long as the polymer particles become sufficiently coated with the composition, such that the composition is adhered to the surface of the polymer particles. Usually, the process is sufficient, so long as the average amount of surface coating is ≥50 percent, and preferably ≥60 percent, or ≥80 percent, based on the total surface area of the polymer particles.

In one embodiment, the thickness of the coating, formed from the composition, is from 1.0 microns to 150 microns, or from 5.0 microns to 100 microns, or from 10 microns to 50 microns. This value may also be expressed in terms of percent increase in the average size of the polymer particles (for example, pellets). This percent increase is generally from 0.01 percent to 15 percent, depending on amount of composition, and the type of method used to apply, and process, the coating.

Examples of blending equipment/processes include any mechanical means of moving the polymer particles, such as, for example, a simple tumbling of a jar, or blending in a conical rotating vessel, ribbon blender, drum tumbler, paddle blender, agglomeration pan and fluidized bed operations. In one embodiment, the coating process includes the use of a pneumatic conveyor, under air or inert gas. Moderate stirring, shaking, or even a short distance of conveying in a screw conveyor, can be sufficient for such adequate distribution of the composition.

The contacting of the composition and the polymer particles can be conducted at any temperature, at which an agent does not evaporate, solidify, become too viscous, or significantly react with the polymer particles. Such temperatures often vary, depending upon the components of the composition, but typically are from –10° C. to 150° C., further from 0° C. to 60° C., or from 5° C. to 35° C.

Articles

The invention also provides an article comprising at least one component formed from polymer particles comprising a coating, formed from a composition as described herein. Article include, but are not limited to, films, injection molded articles, thermoformed articles and foams. Additional articles include food packages, medical devices (e.g., pressure cuffs and stabilization devices); inflatable articles (e.g., toys, watercraft, cushioning and furniture), sheetings (e.g., awnings, banners, signs, tents, tarpaulins, and liners for pools, ponds or landfills), book bindings, and carriers (e.g., sporting bags and backpacks). Additional articles include automotive parts.

DEFINITIONS

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, may be incorporated into and/or within a polymer.

The term "interpolymer," as used herein, refers to polymers prepared by the polymeri-zation of at least two different types of monomers. The term interpolymer thus includes the term copolymer (employed to refer to polymers prepared from two different types of monomers) and polymers prepared from more than two different types of monomers.

The term, "olefin-based polymer," as used herein, refers to a polymer that comprises, in polymerized form, 50 wt % or a majority amount of olefin monomer, for example ethylene or propylene, (based on the weight of the polymer), and optionally may comprise one or more comonomers.

The term, "olefin-based interpolymer," as used herein, refers to an interpolymer that comprises, in polymerized form, 50 wt % or a majority amount of olefin monomer, for example ethylene or propylene, (based on the weight of the interpolymer), and one or more comonomers.

The term, "olefin-based copolymer," as used herein, refers to an copolymer that comprises, in polymerized form, 50 wt % or a majority amount of olefin monomer, for example ethylene or propylene, (based on the weight of the copolymer), and one comonomer, as the only two monomer types.

The term, "ethylene-based polymer," as used herein, refers to a polymer that comprises, in polymerized form, 50 wt % or a majority amount of ethylene monomer (based on the weight of the polymer), and optionally may comprise one or more comonomers.

The term, "ethylene-based copolymer," as used herein, refers to a copolymer that comprises, in polymerized form, 50 wt % or a majority amount of ethylene monomer (based on the weight of the copolymer), and one comonomer, as the only two monomer types.

The term, "ethylene/α-olefin copolymer," as used herein, refers to a copolymer that comprises, in polymerized form, 50 wt % or a majority amount of ethylene monomer (based on the weight of the copolymer), and an α-olefin, as the only two monomer types.

The term "ethylene-based interpolymer," as used herein, refers to an interpolymer that comprises, in polymerized form, ethylene monomer (based on the weight of the interpolymer), and at least one comonomer. Typically, the "ethylene-based interpolymer," comprises, in polymerized form, 50 wt % or a majority amount of ethylene monomer, based on the weight of the interpolymer.

The term "ethylene/α-olefin interpolymer," as used herein, refers to an interpolymer that comprises, in polymerized form, ethylene monomer (based on the weight of the interpolymer), and at least one α-olefin. Typically, the "ethylene/α-olefin interpolymer," comprises, in polymerized form, 50 wt % or a majority amount of ethylene monomer, based on the weight of the interpolymer.

The term "ethylene/α-olefin/diene interpolymer," as used herein, refers to an inter-polymer that comprises, in polymerized form, ethylene monomer, an α-olefin, and a diene. Typically, the "ethylene/α-olefin/diene interpolymer," comprises, in polymerized form, 50 wt % or a majority amount of ethylene monomer, based on the weight of the interpolymer.

The term, "propylene-based polymer," as used herein, refers to a polymer that comprises, in polymerized form, a majority amount of propylene monomer (based on the weight of the polymer), and optionally may comprise one or more comonomers.

The term, "propylene-based interpolymer," as used herein, refers to an interpolymer that comprises, in polymerized form, a majority amount of propylene monomer (based on the weight of the interpolymer), and one or more comonomers.

The term, "propylene-based copolymer," as used herein, refers to a copolymer that comprises, in polymerized form, a majority amount of propylene monomer (based on the weight of the copolymer), and one comonomer, as the only two monomer types.

The term "propylene/α-olefin interpolymer," as used herein, refers to an inter-polymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term "propylene/ethylene interpolymer," as used herein, refers to an interpolymer that comprises, in polymerized form, a majority amount of propylene monomer (based on the weight of the interpolymer), and at least ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The phrase "a portion of the surfaces of the polymer particles," and other similar phrases, as used herein, refer to ≥50% of the total surface of the polymer particles. The total surface of the polymer particles can be determined by BET as discussed above. In one embodiment, ≥60%, or ≥70%, or ≥80%, or ≥90% of the total surface of the polymer particles is coated, as described herein. The amount of surface area coated can be determined by visual inspection.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Embodiments of the present disclosure include but are not limited to the following:

1. A composition comprising the following components:
    A) a metal stearate;
    B) a secondary alcohol ethoxylate as shown below,

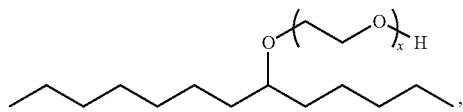

wherein x=7;
    C) a secondary alcohol ethoxylate as shown below,

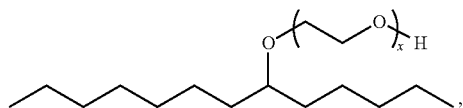

wherein x=20;
    D) octanoic acid;
    E) sodium lauryl sulfate;
    F) a polydimethylsiloxane (PDMS); and
    G) water.

2. The composition of embodiment 1, wherein the metal stearate is calcium stearate.

3. The composition of embodiment 1 or embodiment 2, wherein the metal stearate has a particle size distribution as follows: mean 4.0-10.0 microns, mode 1.0 to 5.0 microns, D90 10.0 to 20.0 microns 4. The composition of any one of the previous embodiments, wherein the amount of component A is from 40 wt % to 60 wt %, based on the weight of the composition.

5. The composition of any one of the previous embodiments, wherein the weight ratio of component B to component C is from 0.80 to 1.20.

6. The composition of any one of the previous embodiments, wherein the weight ratio of component D to component E is from 0.80 to 1.20.

7. The composition of any one of the previous embodiments, wherein the weight ratio of component D to component F is from 0.80 to 1.20.

8. The composition of any one of the previous embodiments, wherein the amount of component B is from 1.0 wt % to 2.0 wt %, based on the weight of the composition.

9. The composition of any one of the previous embodiments, wherein the amount of component C is from 1.0 wt % to 2.0 wt %, based on the weight of the composition.

10. The composition of any one of the previous embodiments, wherein the amount of component E is from 0.2 wt % to 0.7 wt %, based on the weight of the composition.

11. The composition of any one of the previous embodiments, wherein the amount of component D is from 0.2 wt % to 0.7 wt %, based on the weight of the composition.

12. The composition of any one of the previous embodiments, wherein the sum amount of components A and G comprise ≥70 wt %, or ≥75 wt %, or ≥80 wt %, or ≥85 wt %, or ≥90 wt % of the total weight of the composition.

13. The composition of any one of the previous embodiments, wherein the sum amount of components A, B, C, D, E, F and G comprise ≥95 wt %, or ≥98 wt %, or ≥99 wt % of the total weight of the composition.
14. Coated polymer particles, wherein the coating is formed from the composition of any one of the previous embodiments.
15. An article comprising at least one component formed from the coated particles of embodiment 14.
16. A process to form coated polymer particles, said process comprising application the composition of any one of embodiments 1-13, to at least a portion of the surface of the polymer particles.
17. The process of embodiment 16, wherein the polymer particles are formed from a polymer composition comprising an olefin-based polymer.
18. The process of embodiment 16 or embodiment 17, wherein the polymer particles are formed from a polymer composition comprising an ethylene-based polymer.
20. The process of embodiment 16 or embodiment 17, wherein the polymer particles are formed from a polymer composition comprising a propylene-based polymer.
21. The process of embodiment 16 or embodiment 17, wherein the polymer particles are formed from a polymer composition comprising an ethylene/alpha-olefin/diene interpolymer.
22. Coated polymer particles formed from the process of any one of embodiments 16-21.

TEST METHODS

Density is measured according ASTM D792, except for EPDM and similar terpolymers, then density is measured according to ASTM D297.

Melt index ($I_2$) of an ethylene-based polymer is measured at 190° C., under a load of 2.16 kg, according to ASTM D-1238. Melt index ($I_5$) is measured at 190° C., under a load of 5 kg, according to ASTM D-1238. Melt index ($I_{10}$) is measured at 190° C., under a load of 10 kg, according to ASTM D-1238. Melt index ($I_{21}$) is measured at 190° C., under a load of 21.6 kg, according to ASTM D-1238. The melt flow rate (MFR) of a propylene-based polymer is measured in accordance with ASTM D-1238, condition 230° C./2.16 kg.

Particle Size Distribution (D50, D10, D90)

The particle size distribution can be measured using a Beckman Coulter LS 13 320 Laser Diffraction Particle Size Analyzer, equipped with the universal liquid module. This instrument uses the principles of light scattering, where the angular pattern of light, scattered by the particles, is measured. This scattered light pattern is then fed to a deconvolution algorithm to obtain a size distribution. This equipment works on physics first principle, and therefore is not calibrated. The scattering pattern can be affected by the complex refractive index of particles, and by that of the surrounding medium, so for maximum accuracy, the complex index of refraction of the particles, and the suspending media, are taken into account by the model. The complex index of refraction consists of a real part and an imaginary part. The real part is characterized by the bending of light, as it propagates from one medium to another, and the imaginary, or complex part, represents the absorption coefficient of the material.

The index of refraction used in the size distribution measurement was 1.46+0.05i for Calcium Stearate, and 1.57+0.05 for Talc. Guidelines for selection of index of refraction can be found in the LS 13 320 operation manual, provided by Beckman Coulter (Florida, USA). The sample (particles) is suspended in isopropyl alcohol, and then sonicated for five minutes in a sonic bath (Fisher Scientific model FS-14), and then injected into the universal liquid module, which is operated at a pumping speed of 50. The volume median diameter (D50, typically in micron) is defined as the particle diameter where half of the volume distribution resides above this point, and half resides below this point. The D10 is defined as the particle diameter, where 10% of the volume distribution lies below this point (D10). The D90 is defined as the particle diameter where 90% of the volume distribution lies below this point (D90). The mass distribution is identical to the volume distribution, as long all of the particles included in the size distribution have the same density. The Beckman Coulter laser diffraction instrument reports the mean, mode, and D90 values.

Mooney Viscosity (Polymer)

Mooney Viscosity (ML1+4 at 125° C.) was measured in accordance with ASTM 1646, with a one minute preheat time and a four minute rotor operation time. The instrument is an Alpha Technologies Mooney Viscometer 2000.

GPC Molecular Weight and Molecular Weight Distribution

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min, and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by T. Williams & I. M. Ward, *The Construction of a Polyethylene Calibration Curve for Gel Permeation Chromatography Using Polystyrene Fractions*, 6 J. Polymer Sci. Pt. B: Polymer Letter 621, 621-624 (1968)) to derive the following equation:

$$M_{polyethylene} = a \times (M_{polystyrene})^b.$$

In this equation, a=0.4316 and b=1.0.

Number average molecular weight, $M_n$, of a polymer is expressed as the first moment of a plot of the number of molecules in each molecular weight range against the molecular weight. In effect, this is the total molecular weight of all molecules divided by the number of molecules and is calculated in the usual matter according to the following formula:

$$M_n = \sum n_i \times M_i / \sum n_i = \sum w_i / \sum (w_i / M_i),$$

where
 $n_i$=number of molecules with molecular weight $M_i$,
 $w_i$=weight fraction of material having molecular weight $M_i$,
 and $\Sigma n_i$=total number of molecules.

Weight average molecular weight, $M_w$, is calculated in the usual manner according to the following formula: $M_w = \Sigma w_i \times M_i$, where $w_i$ and $M_i$ are the weight fraction and molecular weight, respectively, of the $i^{th}$ fraction eluting from the GPC column. The ratio of these two averages, the molecular weight distribution (MWD or $M_w/M_n$), defines the breadth of the molecular weight distribution.

DSC Standard Method

Differential Scanning Calorimetry (DSC) is used to measure crystallinity in ethylene-based polymers (PE, or OBC) samples and propylene-based polymer (PP) samples. About "five to eight milligrams" of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for ethylene-based polymer samples (230° C. for propylene-based polymer samples). The sample is kept at this temperature for three minutes. Then the sample is cooled at a rate of 10° C./min to −60° C. for ethylene-based polymer samples (−40° C. for propylene-based polymer samples), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for ethylene-based polymer samples (165 J/g, for propylene-based polymer samples), and multiplying this quantity by 100 (e.g., for ethylene-based polymer samples, % cryst.=($H_f$/292 J/g)×100; and for propylene-based polymer samples, % cryst.=($H_f$/165 J/g)×100).

Unless otherwise stated, melting point(s) ($T_m$) of each polymer is determined from the second heat curve obtained from DSC, as described above (peak $T_m$). The crystallization temperature (TO is determined from the first cooling curve (peak TO.

The following examples illustrate the present invention but are not intended to limit the scope of the invention.

EXAMPLES

I. Materials

The materials used in this study are listed in Table 1 below.

TABLE 1

Materials

| Component | Description |
|---|---|
| LIGASTAR ™ 350V | Calcium Stearate Powder |
| TERGITOL ™ 15-S-7 | Food Contact Compliant Nonionic Surfactant* |
| TERGITOL ™ 15-S-20 | Food Contact Compliant Nonionic Surfactant* |
| Sodium Lauryl Sulfate | Food Contact Compliant Anionic Surfactant** |
| XIAMETER ™ MEM-0024 Emulsion | Aqueous Emulsion of Polydimethysiloxane (PDMS) |
| Octanoic Acid | Fatty Acid |
| Water | |

*Secondary alcohol ethoxylate.
**Alkylsulfonate.

II. Preparation of Compositions (Dispersions)

The CaSt dispersions, listed in the Table 2 below, were prepared by first mixing the water, surfactants, PDMS and fatty acid to give a solution. Next, calcium stearate was mixed into the solution, using a "one inch" COWELS blade, attached to a CAFRAMO overhead mixer. Mixing was started at 1,200 rpm, to slowly mix the powder into the liquid phase. After mixing for five minutes, the mixer was stopped, and the sides of the container and mixing blade were scraped with a spatula, to remove unmixed powder, to allow it to become incorporated it into the dispersion. The dispersion was then mixed at 2,000 rpm for an additional five minutes.

TABLE 2

| | Compositions (wt %) | | | |
|---|---|---|---|---|
| Component | Dispersion A (inv.) | Dispersion B (comp.) | Dispersion C (comp.) | Dispersion D (comp.) |
| Water (wt %) | 50 | 50 | 50 | 50 |
| TERGITOL ™ 15-S-7 (wt %) | 1.5 | 1.5 | 1.5 | 1.5 |
| TERGITOL ™ 15-S-20 (wt %) | 1.5 | 1.5 | 1.5 | 1.5 |
| Sodium Lauryl Sulfate (wt %) | 0.5 | 0 | 0.5 | 0.5 |
| XIAMETER ™ MEM-0024 Emulsion (wt % PDMS) | 0.5 | 0.5 | 0 | 0.5 |
| Octanoic Acid (wt %) | 0.5 | 0.5 | 0.5 | 0 |
| LIGASTAR ™ 350V (wt %) | 45.5 | 46 | 46 | 46 |
| pH of dispersion* | 6.3 | 6.0 | 7.4 | 6.1 |

Each wt % based on the weight of the composition.
*pH measured with a silver/silver chloride electrode.

III. Aging Study—Shelf Stability

The dispersions were heat aged at 40° C. (static oven) to assess shelf stability. The viscosities of the dispersions were qualitatively evaluated on a weekly basis. Dispersion A did not show a substantial change in viscosity or stability (visual observations consisting of gently inserting a dip stick into the sample vial, and examining if any sediment was present, and observing the amount of dispersion adhered to the stick when removed. Sedimentation observations consisted of the following: none observed, a soft packing, or a thick gel/paste. Soft packing is considered re-dispersible. Increased viscosity yielded more dispersion on the stick upon removal) after ten weeks, whereas Dispersions B, C and D solidified or thickened considerably after one week.

IV. The pH Stability

The pH of Dispersion A, shown in Table 2, is measured at 6.3. Aliquots of Dispersion A were dosed with a potassium hydroxide solution to determine the stability at pH values ranging from 6.3, 7, 8, 9, 10 and 11. All of the dispersions with artificially increased pH showed poor stability beyond two weeks at room temperature and also at 40° C. (pH measured with silver/silver chloride pH electrode).

V. Additional Comparative Compositions (Dispersions)

Additional comparative compositions are listed in Tables 3-5 below.

TABLE 3

| Component | wt % |
|---|---|
| Metal Salt (e.g. Calcium Stearate) | ≥45 |
| Nonionic Surfactant (preferably polyoxyalkylene ether) | 0.5-10 |
| Anionic Surfactant (preferably alkylarylsulfonate) | 0.5-10 |
| Water | |

Disadvantages: It has been discovered that compositions as listed in Table 3 should not be shelf stable (40° C., 10 weeks) due to a lack of stabilizer, in the form of octanoic acid, as seen in Dispersion D in Table 2. Also, the listed surfactants and surfactant levels used, may not be food contact compliant. See JP59051236A (Abstract).

TABLE 4

| Component | wt % |
|---|---|
| Metal Salt (e.g. Calcium Stearate) | 38-60 |
| Nonionic Surfactant (polyoxyalkylene ether) | 0.5-2.5 |
| Anionic Surfactant (alkylsulfonate) | 0.5-2.5 |
| Anionic Surfactant (alpha-olefin sulfonate) | 0.6-1.0 |
| Water | 35-62 |

Disadvantages: The listed anionic and nonionic surfactants and surfactant levels used, may not be food contact compliant. See JP59219400A (Abstract).

TABLE 5

| Component | wt % |
| --- | --- |
| Metal Salt (e.g. Calcium Stearate) | 41-68 |
| Emulsifier A (nonionic surfactant) | 1-2.5% |
| Emulsifier B (nonionic surfactant) | 1.5-3.0 |
| Auxiliary Ingredient | 0-1.25 |
| Dispersing Agent | 0.25-1.24 |
| Antifoaming Agent | 0.15-0.5 |
| Water | 25-58 |

Disadvantages: It has been discovered that CaSt dispersions, based on blends of nonionic surfactants, are not shelf stable, unless an anionic surfactant is included. The listed surfactants and surfactant levels as seen in Table 5, may not be food contact compliant. See CN102094356A (Abstract).

What is claimed is:

1. A composition comprising the following components:
   A) a metal stearate;
   B) a secondary alcohol ethoxylate as shown below,

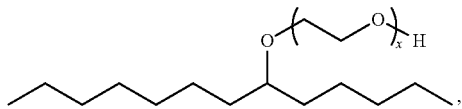

wherein x=7;
   C) a secondary alcohol ethoxylate as shown below,

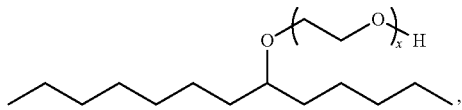

wherein x=20;
   D) octanoic acid;
   E) sodium lauryl sulfate;
   F) a polydimethylsiloxane (PDMS); and
   G) water.

2. The composition of claim 1, wherein the metal stearate is calcium stearate.

3. The composition of claim 1 wherein the metal stearate has a particle size distribution as follows: mean 4.0-10.0 microns, mode 1.0 to 5.0 microns, D90 10.0 to 20.0 microns.

4. The composition of claim 1, wherein the amount of component A is from 40 wt % to 60 wt %, based on the weight of the composition.

5. The composition of claim 1, wherein the weight ratio of component B to component C is from 0.80 to 1.20.

6. The composition of claim 1, wherein the weight ratio of component D to component E is from 0.80 to 1.20.

7. The composition of claim 1, wherein the weight ratio of component D to component F is from 0.80 to 1.20.

8. The composition of claim 1, wherein the amount of component B is from 1.0 wt % to 2.0 wt %, based on the weight of the composition.

9. The composition of any claim 1, wherein the amount of component C is from 1.0 wt % to 2.0 wt %, based on the weight of the composition.

10. The composition of claim 1, wherein the amount of component E is from 0.2 wt % to 0.7 wt %, based on the weight of the composition.

11. The composition of claim 1, wherein the amount of component D is from 0.2 wt % to 0.7 wt %, based on the weight of the composition.

12. The composition of claim 1, wherein the sum amount of components A and G comprise ≥70 wt % of the total weight of the composition.

13. The composition of claim 1, wherein the sum amount of components A, B, C, D, E, F and G comprise ≥95 wt % of the total weight of the composition.

14. Coated polymer particles, wherein the coating is formed from the composition of claim 1.

15. An article comprising at least one component formed from the coated particles of claim 14.

* * * * *